United States Patent
Suzuki et al.

(10) Patent No.: US 8,256,590 B2
(45) Date of Patent: Sep. 4, 2012

(54) VIBRATION SUPPRESSING DEVICE AND VIBRATION SUPPRESSING METHOD FOR MACHINE TOOL

(75) Inventors: Norikazu Suzuki, Nagoya (JP); Eiji Shamoto, Nagoya (JP); Hiroshi Inagaki, Niwa-Gun (JP)

(73) Assignees: Okuma Corporation, Niwa-Gun (JP); National University Corporation Nagoya University, Nagoya-Shi (JP)

( * ) Notice: Subject to any disclaimer, the term of this patent is extended or adjusted under 35 U.S.C. 154(b) by 1120 days.

(21) Appl. No.: 12/107,191

(22) Filed: Apr. 22, 2008

(65) Prior Publication Data

US 2008/0289923 A1 Nov. 27, 2008

(30) Foreign Application Priority Data

May 24, 2007 (JP) ................ 2007-138164
May 24, 2007 (JP) ................ 2007-138166
May 24, 2007 (JP) ................ 2007-138375

(51) Int. Cl.
*F16F 7/10* (2006.01)

(52) U.S. Cl. ........ 188/379; 188/280; 188/285; 188/378; 83/61; 83/312; 83/477.2; 83/522.11; 408/143; 408/11; 408/17; 409/79; 409/131; 409/141; 700/159; 700/173; 700/174; 700/175; 700/177

(58) Field of Classification Search ................ 188/379; 83/58, 62.1, 76.8, 477.2, DIG. 1, 781, 485, 83/76.7, 581, 72; 345/695, 87, 90; 361/91.1, 361/42, 47

See application file for complete search history.

(56) References Cited

U.S. PATENT DOCUMENTS

| 4,435,751 A * | 3/1984 | Hori et al. ............ 700/280 |
| 6,085,121 A | 7/2000 | Stern |
| 7,540,697 B2 * | 6/2009 | Wang et al. ........... 409/141 |
| 2005/0160811 A1 * | 7/2005 | Dyer ............... 73/462 |

FOREIGN PATENT DOCUMENTS

| JP | 2001-517557 A1 | 10/2001 |
| JP | 2003-340627 A1 | 12/2003 |
| JP | 2007-044852 | 2/2007 |

* cited by examiner

*Primary Examiner* — Robert A Siconolfi
*Assistant Examiner* — San Aung
(74) *Attorney, Agent, or Firm* — Burr & Brown

(57) ABSTRACT

A vibration suppressing device and a vibration suppressing method that are capable of obtaining an accurate optimum rotation speed and shortening a time period from generation of chatter vibration to calculation of the optimum rotation speed are provided. The vibration suppressing device includes: vibration sensors for detecting time-domain vibrational accelerations of a rotary shaft in rotation; and a control device for calculating a chatter frequency and a frequency-domain vibrational acceleration of the rotary shaft at the chatter frequency on the basis of the time-domain vibrational accelerations detected by the vibration sensors, and when the calculated frequency-domain vibrational acceleration exceeds a predetermined threshold value, calculating an optimum rotation speed on the basis of a predetermined parameter, and rotating the rotary shaft at the calculated optimum rotation speed.

22 Claims, 8 Drawing Sheets

VIBRATION SUPPRESSING DEVICE AND VIBRATION SUPPRESSING METHOD FOR MACHINE TOOL

CROSS-REFERENCE TO RELATED APPLICATIONS

This application claims the benefit of Japanese Patent Application Numbers 2007-138164, 2007-138166 and 2007-138375 which were filed on May 24, 2007, the entirety of which is incorporated by reference.

FIELD OF THE INVENTION

The present invention relates to a vibration suppressing device and a vibration suppressing method for suppressing vibration generated during machining in a machine tool that performs the machining while rotating a tool or work.

BACKGROUND OF THE INVENTION

There has conventionally been a machine tool, for example, where a work is supported by a rotatable main spindle and machined while a tool is being fed to the work. However, in the conventional machine, when a cutting depth in cutting machining is made larger than necessary, so-called "chatter vibration" is generated during the machining, resulting in deterioration in finishing accuracy of a machined surface. Particularly, "regenerative type chatter vibration" which is self-excited vibration generated during machining. To suppress the "regenerative type chatter vibration", it is known as described in Patent documents 1 and 2 to use a rotation speed which is equal to a value derived by obtaining a natural frequency of a system such as the tool or work where the "chatter vibration" is generated, or a frequency of the chatter vibration during the machining; multiplying the natural frequency or the chatter frequency by 60; and dividing the multiplied frequency by the number of tool blades and a predetermined integer. The rotation speed calculated based on the above procedure is hereinafter referred to as a stable rotation speed.

In order to obtain the natural frequency of the system where the "chatter vibration" is generated, there is known a method in which, for example, the "natural frequency" is obtained by applying impulse excitation to the tool or work to measure a frequency, as described in Patent document 1. Further, in order to obtain the chatter frequency during the machining, for example, a sound sensor is arranged near the tool or work in rotation, and the sensor detects a vibrational frequency during the machining to obtain the "chatter frequency", as described in Patent document 2.
[Patent document 1] Japanese Unexamined Patent Publication No. 2003-340627
[Patent document 2] Japanese Translation of PCT No. 2001-517557

SUMMARY OF THE INVENTION

However, if the "natural frequency" is obtained on the basis of a method described in the above Patent document 1, an expensive impulse device is required, so the cost will be high. Further, an excitation method described in Patent document 1 is less practical although it requires advanced techniques, because, for example, a "natural frequency" measured before the machining and a "natural frequency" measured during the machining do not always coincide with each other, and therefore it is not easy to obtain an optimum rotation speed accurately.

On the other hand, in a method of the above Patent document 2, sound of the rotation, or the like, detected by the sound sensor is analyzed to attempt to obtain the "chatter frequency". However, there is a difference between the "chatter frequency" calculated on the basis of the analysis of the rotation sound, or the like, and that at the optimum rotation speed. As a result, it is difficult to obtain the optimum rotation speed accurately, similarly to the method of the above Patent document 1. In other words, when the "chatter frequency" is calculated on the basis of the rotation sound, or the like, machining and measurements are further performed several times, and then the "chatter frequency" is asymptotically obtained after the detection of the vibrational frequency corresponding to the "chatter vibration". For this reason, a long time period is required from the detection of the "chatter vibration" to the calculation of the optimum rotation speed, resulting in traces due to the chatter vibration on a machined surface.

Therefore, the present invention is a vibration suppressing device and vibration suppressing method that are capable of obtaining the accurate optimum rotation speed, and shortening a time period from the generation of the chatter vibration to the calculation of the optimum rotation speed.

In order to accomplish the above object, a first aspect of the present invention is a vibration suppressing device for suppressing chatter vibration generated upon rotating a rotary shaft in a machine tool provided with the rotary shaft for rotating a tool or a work, and characterized by including: detecting means to detect time-domain vibration due to the rotating rotary shaft; calculating means to calculate a chatter frequency and frequency-domain vibration at the chatter frequency on a basis of the time-domain vibration detected by the detecting means, and calculate an optimum rotation speed of the rotary shaft on a basis of a predetermined parameter upon the calculated frequency-domain vibration exceeding a predetermined threshold value, the optimum rotation speed being capable of suppressing the chatter vibration; and rotation speed controlling means to rotate the rotary shaft at the optimum rotation speed calculated by the calculating means.

A second aspect of the present invention is a vibration suppressing method for a machine tool provided with a rotary shaft for rotating a tool or a work, and characterized in that chatter vibration generated upon rotating the rotary shaft is suppressed by performing: a detecting step of detecting time-domain vibration due to the rotary shaft in rotation; a calculating step of calculating a chatter frequency and frequency-domain vibration at the chatter frequency on a basis of the time-domain vibration detected in the detecting step, and calculating an optimum rotation speed of the rotary shaft on a basis of a predetermined parameter when the calculated frequency-domain vibration exceeds a predetermined threshold value, the optimum rotation speed being capable of suppressing the chatter vibration; and a controlling step of rotating the rotary shaft at the optimum rotation speed calculated in the calculating step.

It should be noted that the term "vibration" in the description in the present invention includes a vibrational acceleration, displacement due to the vibration, sound pressure due to the vibration, and the like.

According to the present invention, the optimum rotation speed is calculated on the basis of the "chatter vibration" generated in the rotary shaft that is being actually rotated, so that the optimum rotation speed can be immediately calculated more accurately, and the calculated optimum rotation speed can be immediately utilized for the rotation of the rotary shaft. Consequently, the "chatter vibration" generated in the rotary shaft can be effectively suppressed, and therefore finishing accuracy of a machined surface can be kept high in quality, the tool is suppressed from wearing and prevented from chipping.

DETAILED DESCRIPTION OF THE INVENTION

A vibration suppressing device according to one embodiment of the present invention will hereinafter be described based on the drawings.

Embodiment 1

Figure 1:
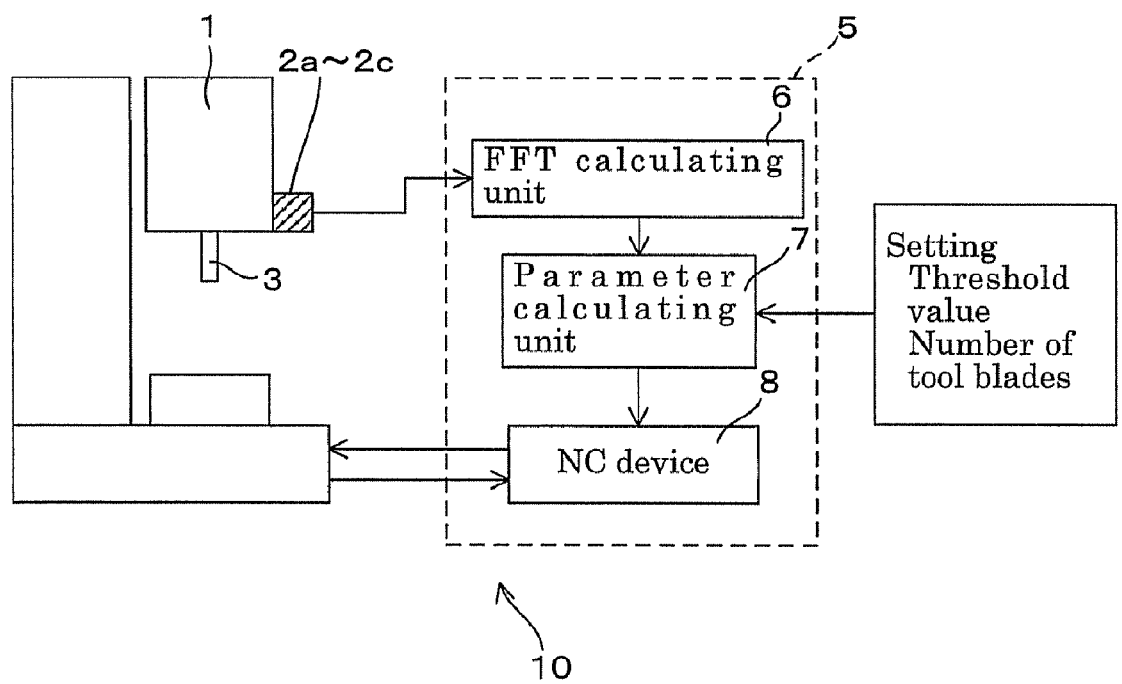
FIG. 1 is an explanatory diagram illustrating a block configuration of a vibration suppressing device according to an Embodiment 1.
Figure 2:
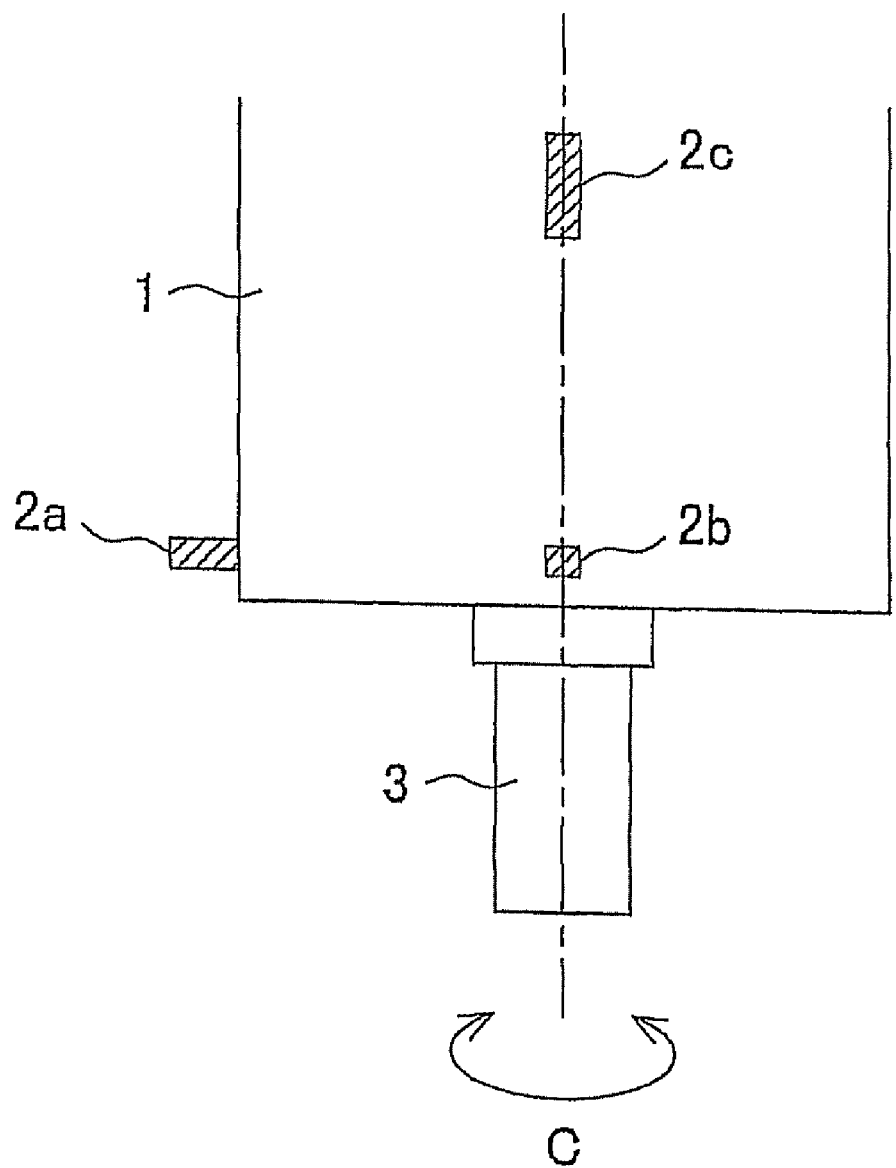
FIG. 2 is an explanatory diagram laterally illustrating a rotary shaft housing, which is subject to vibration suppression.
Figure 3:
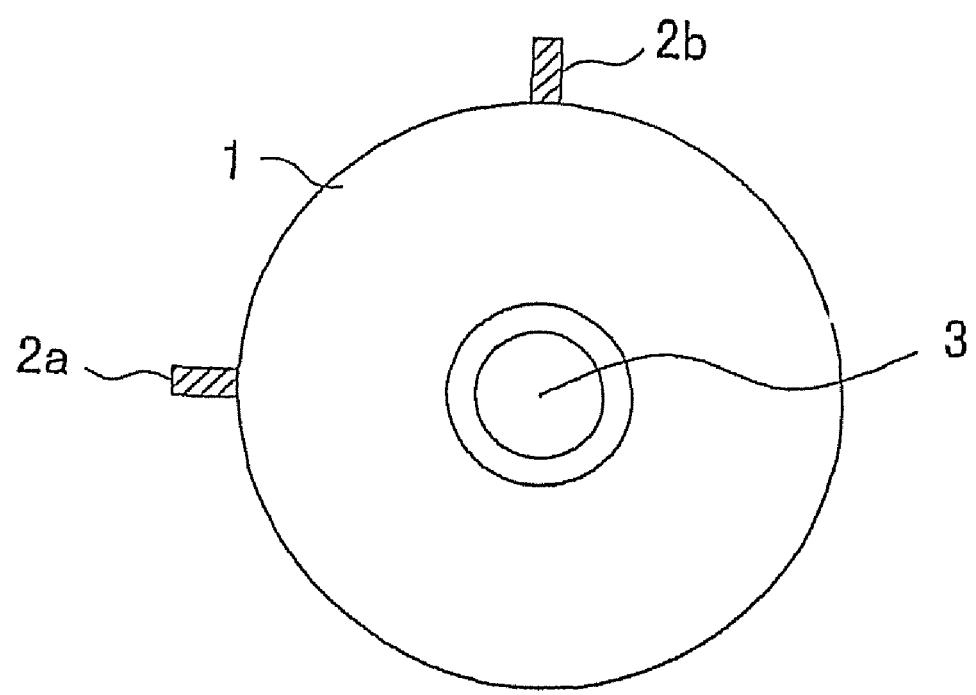
FIG. 3 is an explanatory diagram illustrating the rotary shaft housing in a shaft direction.

FIG. 1 is an explanatory diagram illustrating a block configuration of a vibration suppressing device 10. FIG. 2 is an explanatory diagram laterally illustrating a rotary shaft housing 1, which is subject to vibration suppression. FIG. 3 is an explanatory diagram illustrating the rotary shaft housing 1 in a shaft direction.

The vibration suppressing device 10 suppresses "chatter vibration" generated in a rotary shaft 3 rotatably provided around a C-axis put through the rotary shaft housing 1, and includes vibration sensors (detecting means) 2a to 2c for detecting time-domain vibrational accelerations generated in the rotating rotary shaft 3, and a control device (calculating means and rotation speed controlling means) 5 for controlling a rotation speed of the rotary shaft 3 on the basis of values detected by the vibration sensors 2a to 2c.

The vibration sensors 2a to 2c are attached to the rotary shaft housing 1 as illustrated in FIGS. 2 and 3, and one of the vibration sensors detects the time-domain vibrational acceleration (which means a vibrational acceleration on a time axis) in a direction orthogonal to the other sensors (for example, the vibration sensors 2a to 2c detect the time-domain vibrational accelerations in respectively orthogonal X, Y, and Z directions).

On the other hand, the control device 5 includes: a FFT calculating unit 6 for performing an analysis on the basis of the time-domain vibrational accelerations detected by the vibration sensors 2a to 2c; a parameter calculating unit 7 for calculating an optimum rotation speed on the basis of a value calculated by the FFT calculating unit 6; and an NC device 8 for controlling machining in the rotary shaft housing 1, and performs the analysis to be described later in the FFT calculating unit 6 and monitoring of the rotation speed of the rotary shaft 3.

Figure 4:
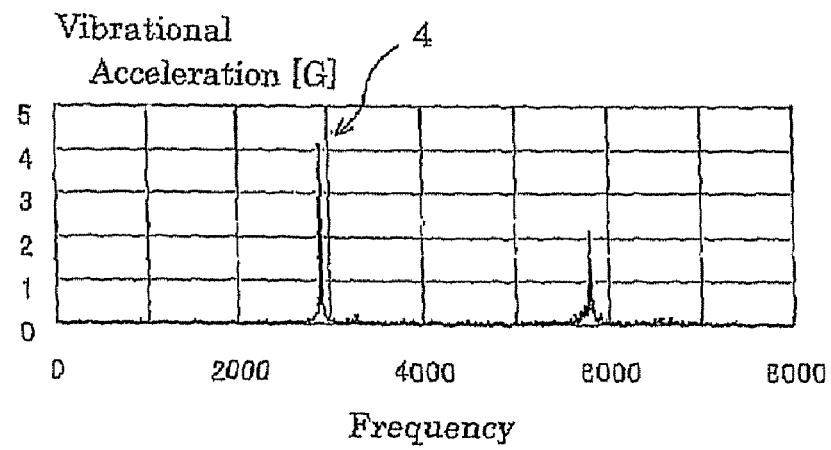
FIG. 4 is an explanatory diagram illustrating one example of a Fourier analysis result of time-domain vibrational accelerations.
Figure 5:
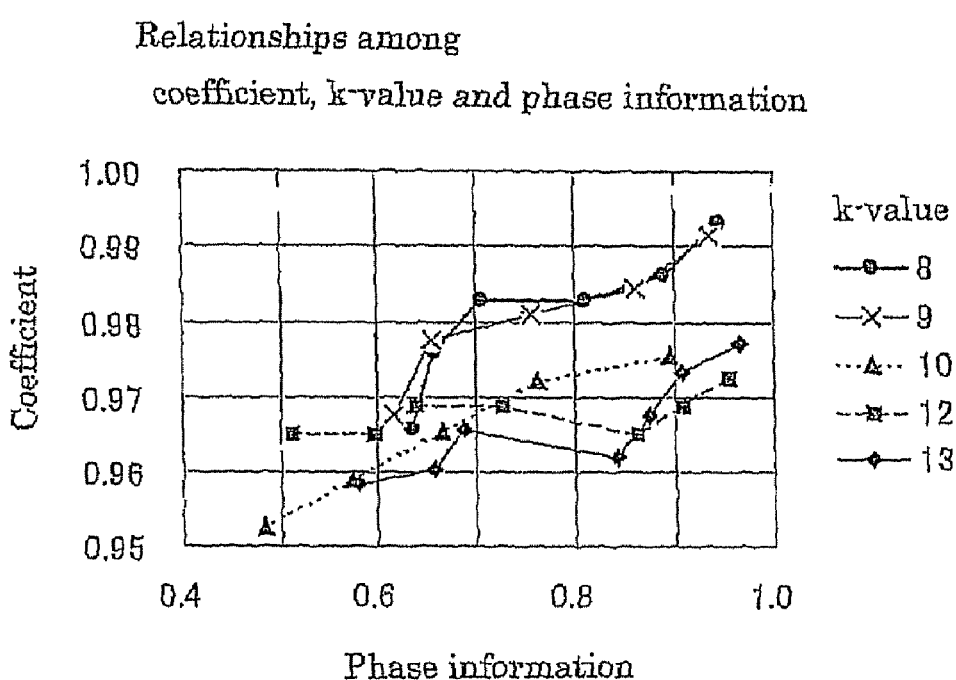
FIG. 5 is an explanatory diagram illustrating one example of relationships among a coefficient, k-value and phase that are necessary for calculating an optimum rotation speed.
Figure 6:
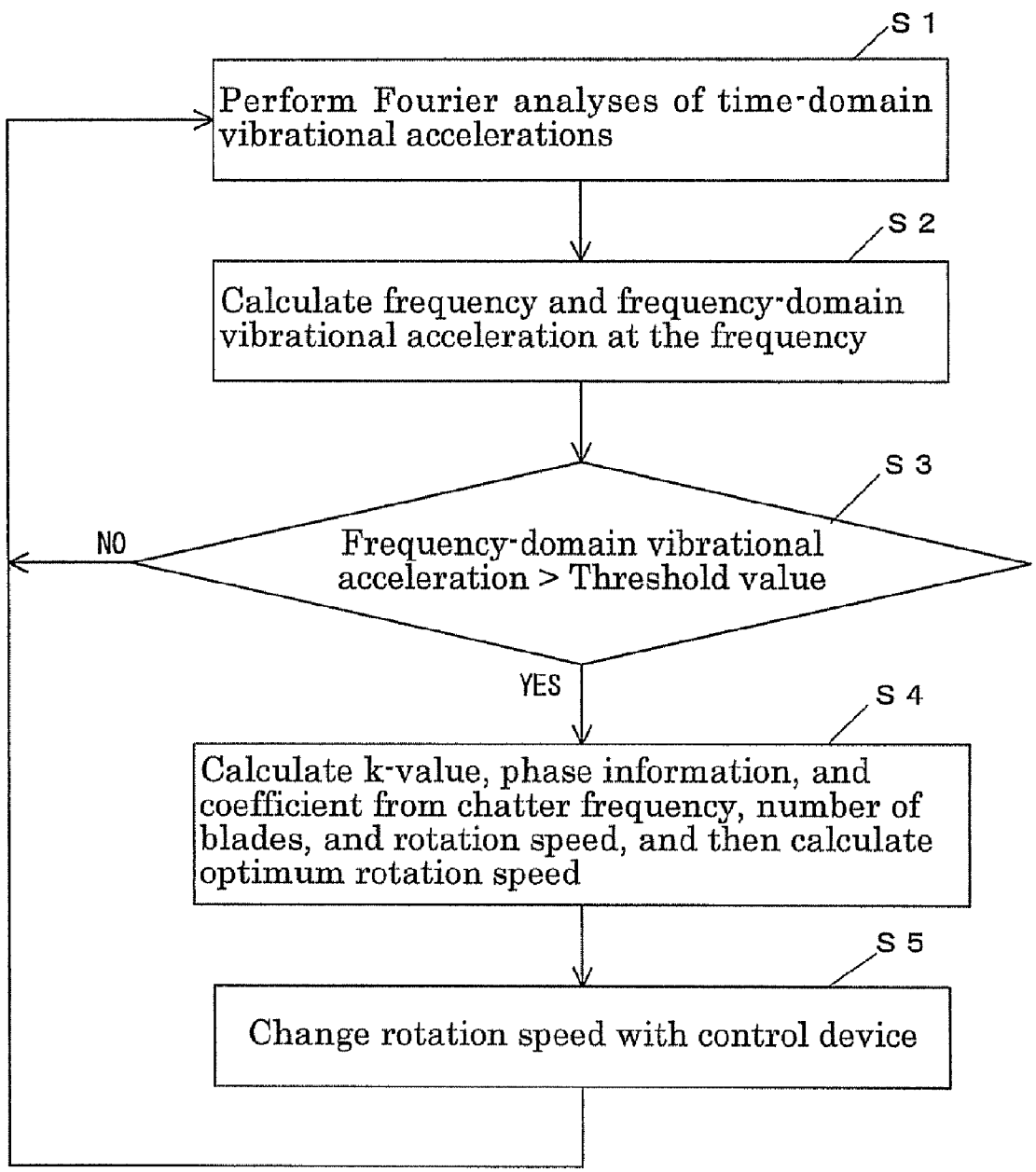
FIG. 6 is a flowchart pertaining to suppression control of chatter vibration.

Suppression control of the "chatter vibration" in the control device 5 is now described on the basis of FIGS. 4 to 6. FIG. 4 is an explanatory diagram illustrating one example of a result of the Fourier analyses of the time-domain vibrational accelerations. FIG. 5 is an explanatory diagram illustrating one example of relationships among a coefficient, k-value and phase that are necessary for calculating the optimum rotation speed. FIG. 6 is a flowchart illustrating the suppression control of the "chatter vibration".

First, the FFT calculating unit 6 performs the Fourier analyses of the time-domain vibrational accelerations continuously detected at positions of the vibration sensors 2a to 2c during the rotation (S1). Then, the unit 6 calculates a frequency (chatter frequency) of the rotary shaft 3 and a frequency-domain vibrational acceleration (which means a vibrational acceleration on a frequency axis) of the rotary shaft 3 at the frequency as illustrated in FIG. 4 (S2). When the above-described Fourier analyses of the time-domain vibrational accelerations are performed, a plurality of pinnacle patterns as shown in FIG. 4 where a relationship between a frequency and a frequency-domain vibrational acceleration is illustrated are obtained. In Embodiment 1, a pinnacle having the maximum frequency-domain vibrational acceleration value is used to perform the control.

The parameter calculating unit 7 compares the frequency-domain vibrational acceleration having been calculated by the above FFT calculating unit 6 with a predetermined threshold value having been preset (S3). When the calculated frequency-domain vibrational acceleration exceeds the predetermined threshold value (for example, when a frequency-domain vibrational acceleration value 4 in FIG. 4 is detected), the parameter calculating unit 7 calculates the optimum rotation speed using the following calculating expressions (1) to (5) on the assumption that the "chatter vibration" to be suppressed is generated in the rotary shaft 3 (S4). Subsequently, in the NC device 8, the rotation speed of the rotary shaft 3 is controlled so as to be equal to the calculated optimum rotation speed (S5) to thereby prevent amplification of the "chatter vibration", i.e., to suppress the "chatter vibration".

It should be note that the detection of the vibrational accelerations by the vibration sensors 2a to 2c in the above description corresponds to the detecting step in the vibration suppressing method of the present invention; the calculation of the optimum rotation speed in the FFT calculating unit 6 and the parameter calculating unit 7 corresponds to the calculating step in the vibration suppressing method of the present invention; and the control of the rotation speed to the optimum rotation speed by the NC device 8 corresponds to the controlling step in the vibration suppressing method of the present invention.

In the above manner, the suppression control of the "chatter vibration" in the control device 5 is performed.

$$k'\text{-value} = 60 \times \text{Chatter frequency}/(\text{Number of tool blades} \times \text{Rotation speed of rotary shaft}), \quad (1)$$

$$k\text{-value} = \text{Integer portion of } k'\text{-value}, \quad (2)$$

$$\text{Phase information} = k'\text{-value} - k\text{-value}, \quad (3)$$

$$\text{Coefficient} = a - b \times k\text{-value} + c \times \text{Phase information, and} \quad (4)$$

$$\text{Optimum rotation speed} = \text{Coefficient} \times \text{Stable rotation speed} \quad (5)$$

where the "Number of tool blades" in the expression (1) is supposed to be preset in the parameter calculating unit 7. The rotation speed of the rotary shaft in the expression (1) refers to a current rotation speed (before optimizing the rotation speed). Further, the stable rotation speed in the expression (5) refers to a rotation speed calculated by the method described in the above "Background art", and the "chatter frequency" in the calculation is supposed to employ a value obtained on the basis of the Fourier analyses.

Next, how the constants a, b, and c in the expression (4) are determined is described.

The constants a, b, and c are determined from the stability limit diagram, which is produced on the basis of various conditions such as a relationship between a rotation speed of the rotary shaft 3 and the "chatter frequency". For example, test machining is performed at various rotation speeds, and the Fourier analyses of the time-domain vibrational accelerations detected during the machining are performed to calculate the frequency (chatter frequency) of the rotary shaft and the frequency-domain vibrational acceleration at the frequency. The frequency-domain vibrational acceleration during the machining is periodically increased and decreased in accordance with the change in rotation speed, and a rotation speed at which the frequency-domain vibrational acceleration is minimized is the optimum rotation speed to be obtained. For this purpose, the phase information, k-value, stable rotation speed, and the like at each rotation speed are obtained with use of the above calculating expressions, and then the relationships among respective elements (phase information and k-value) and a value (i.e., coefficient) derived by dividing by the stable rotation speed the rotation speed at which the frequency-domain vibrational acceleration is minimized are obtained as illustrated in FIG. 5. Subsequently, from the relationships illustrated in FIG. 5, the constants a, b, and c in the above calculating expression for the coefficient (expression (4)) are determined with use of various analytical approaches (for example, a 0.971, b=0.003, and c=0.045, or other combination).

The vibration suppressing device 10, which performs the vibration suppressing method as described above, monitors a "chatter vibration" generated during rotation of the rotary shaft 3 in real time with use of the vibration sensors 2a to 2c, the FFT calculating unit 6, and the parameter calculating unit 7; calculates the optimum rotation speed on the basis of the above calculating expressions (1) to (5) immediately after the "chatter vibration" is detected; and makes the rotation speed of the rotary shaft 3 equal to the optimum rotation speed to thereby suppress the amplification of the "chatter vibration". That is, the optimum rotation speed is calculated on the basis of the "chatter vibration" generated in the actually rotating rotary shaft 3, so that the optimum rotation speed can be immediately calculated more accurately. Consequently, the "chatter vibration" can be effectively suppressed, and therefore finishing accuracy of a machined surface can be kept high in quality, the tool is suppressed from wearing and prevented from chipping.

It should be note that the configuration pertaining to the vibration suppressing device of the present invention is not limited to any aspect described in the above Embodiment 1, but the configurations pertaining to the detecting means, control device, control of the vibration suppression performed in the control device, and the like may be appropriately modified as necessary without departing from the scope of the present invention.

For example, if the relationships among the phase information, k-value, and coefficient as represented by the expression (4) and illustrated in FIG. 5 are appropriately checked and determined depending on a type of a machine tool, the accuracy can be further improved. In other words, the calculation of the coefficient is not limited to the expression (4) described in the above Embodiment 1 at all.

Further, the above Embodiment 1 is configured to calculate and obtain the coefficient on the basis of the expression (4); however, it may be configured such that a plurality of values of the coefficients are preliminarily stored in the control device so as to correspond to the k-value and phase information, and one of the coefficients is selected and determined in accordance with the calculated k-value and phase information (i.e., the expression (4) may be omitted).

Embodiment 2

Figure 7:
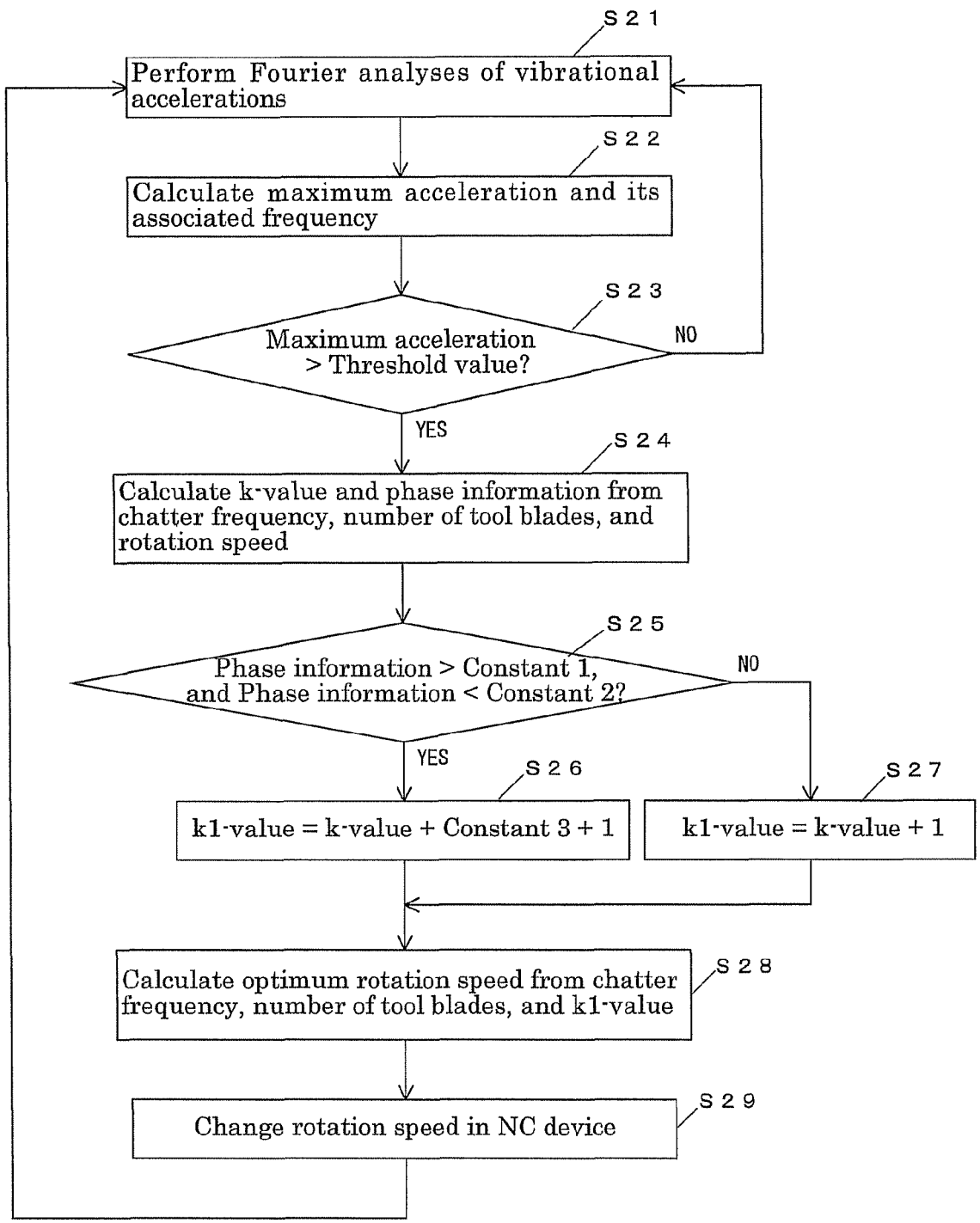
FIG. 7 is a flowchart pertaining to suppression control of the chatter vibration, according to an Embodiment 2.

Next, another embodiment of the present invention is described. Configurations of the vibration suppressing device and rotary shaft housing are the same as those in Embodiment 1, so that duplicate description of them is omitted. The suppression control of the "chatter vibration" in the control device 5 is described on the basis of the flowchart illustrated in FIG. 7.

First, in the FFT calculating unit 6, the Fourier analyses is performed regarding the time-domain vibrational accelerations continuously detected at the positions of the vibration sensors 2a to 2c during the rotation (S21). Then, the maximum acceleration as illustrated by Reference numeral 4 of FIG. 4 and its associated frequency (chatter frequency) are calculated (S22).

Next, in the parameter calculating unit 7, the maximum acceleration having been calculated in the above S22 and a predetermined threshold value having been preset are compared with each other (S23). When the maximum acceleration exceeds the threshold value, the k-value and phase information are calculated in S24 on the basis of the chatter frequency, number of tool blades, and rotation speed of the rotary shaft 3 with use of the following calculating expressions (1) to (3), on the assumption that the "chatter vibration" to be suppressed is generated in the rotary shaft 3.

$$k'\text{-value} = 60 \times \text{Chatter frequency} / (\text{Number of tool blades} \times \text{Rotation speed of rotary shaft}), \quad (1)$$

$$k\text{-value} = \text{Integer portion of } k'\text{-value, and} \quad (2)$$

$$\text{Phase information} = k'\text{-value} - k\text{-value}, \quad (3)$$

where the "Number of tool blades" in the calculating expression (1) is supposed to be preset in the parameter calculating unit 7. Further, the rotation speed of the rotary shaft in the calculating expression (1) refers to a current rotation speed (before optimizing the rotation speed).

Subsequently, in S25, the phase information obtained with the calculating expression (3) is compared with constants 1 and 2. If the phase information is larger than the constant 1 and smaller than the constant 2, the k1-value is calculated in S26 on the basis of a modifying expression (1) on the assumption that the forced chatter vibration is generated. On the other hand, if the phase information is out of this range, the k1-value is calculated in S27 on the basis of a modifying expression (2) on the assumption that the regenerative type chatter vibration is generated. The determination condition in S25 is a predetermined condition for identifying a type of the chatter vibration.

$$k1\text{-value} = k\text{-value} + \text{Constant } 3 + 1 \quad \text{Modifying expression (1)}$$

$$k1\text{-value} = k\text{-value} + 1 \quad \text{Modifying expression (2)}$$

In addition, given that the constant 1 is 0, and the constant 2 is 0.1, the forced chatter vibration can be selected to thereby distinguish from the regenerative type chatter vibration. Further, when the constant 3 is set to 0.5 or −0.5 typically, the forced chatter vibration can be best suppressed. The selection of ± (plus or minus) corresponds to that of the increase or decrease of the rotation speed.

Subsequently, in S28, the optimum rotation speed is calculated on the basis of the following calculating expression (6) using the chatter frequency, number of tool blades, and the k1-value obtained in S26 or S27.

$$\text{Optimum rotation speed} = 60 \times \text{Chatter frequency}/(\text{Number of tool blades} \times k1\text{-value}) \quad (6)$$

Finally, in S29, the rotation speed of the rotary shaft 3 is changed with the NC device 8 so as to be made equal to the calculated optimum rotation speed to thereby prevent amplification of the "chatter vibration", i.e., to suppress the "chatter vibration".

In the above manner, the suppression control of the "chatter vibration" is performed in the control device 5.

As described above, the vibration suppressing device 10, according to the Embodiment 2, monitors the "chatter vibration" generated during rotation of the rotary shaft 3 in real time with use of the vibration sensors 2a to 2c, the FFT calculating unit 6, and the parameter calculating unit 7. Then, the device 10 calculates the optimum rotation speed on the basis of the above calculating expressions (1) to (3) and (6) and modifying expressions (1) and (2) immediately after the generation of the "chatter vibration" is detected. Then, the rotation speed of the rotary shaft 3 is made equal to the optimum rotation speed to thereby suppress the amplification of the "chatter vibration". In other words, the optimum rotation speed is calculated on the basis of the "chatter vibration" generated upon the rotating rotary shaft in the actually rotating rotary shaft 3, so that the optimum rotation speed can be immediately calculated more accurately. In particular, the parameter calculating unit 7 identifies a type of the generated chatter vibration, and calculates the optimum rotation speed with a parameter being changed depending on the type, so that the forced chatter vibration and the regenerative type chatter vibration can be clearly distinguished from each other to immediately obtain the optimum rotation speed for each of the cases. As a result, it becomes possible to effectively suppress the chatter vibration. Accordingly, the finishing accuracy of the machined surface can be kept high in quality, and it can also be expected to suppress the tool from wearing and prevent the tool from chipping.

In the Embodiment 2, the phase information, k-value, constants, and the like, and relationships among them as represented by the calculating expressions (1) to (3) and (6) and modifying expressions (1) and (2) can be appropriately checked and determined depending on a type of a machine tool, so that the accuracy can be further improved.

Embodiment 3

Figure 8:
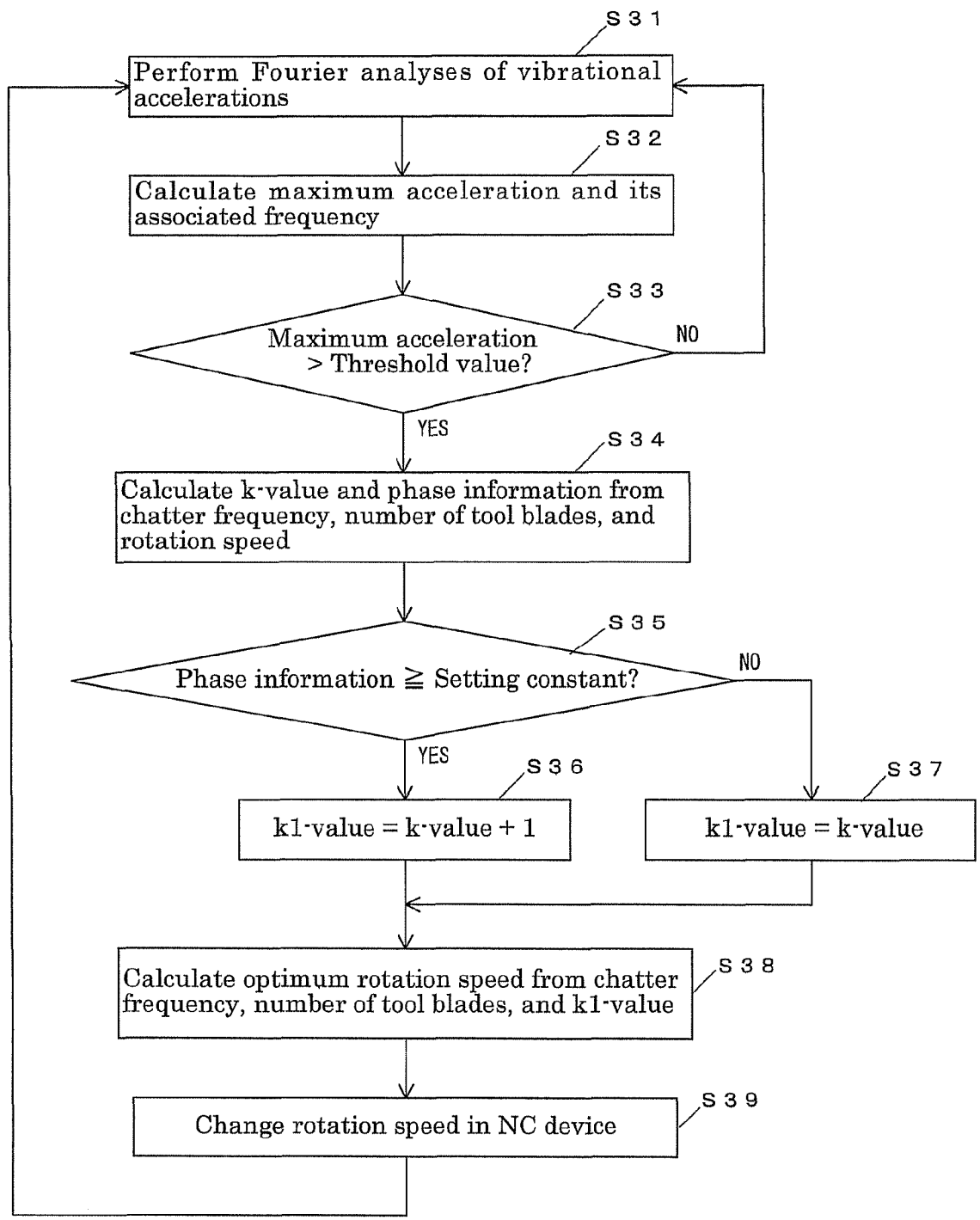
FIG. 8 is a flowchart pertaining to suppression control of the chatter vibration, according to an Embodiment 3.

Referring to FIG. 8, in the FFT calculating unit 6, the Fourier analyses are first performed regarding the time-domain vibrational accelerations continuously detected at the positions of the vibration sensors 2a to 2c during the rotation (S31), and the maximum acceleration as illustrated by Reference numeral 4 of FIG. 4 and its associated frequency (chatter frequency) are calculated (S32).

Then, in the parameter calculating unit 7, the maximum acceleration having been calculated in the above S32 is compared with a predetermined threshold value having been preset (S33), and if the maximum acceleration exceeds the threshold value, the k-value and phase information are calculated in S34 on the basis of the chatter frequency, number of tool blades, and rotation speed of the rotary shaft 3 with use of the following calculating expressions (1) to (3), on the assumption that the chatter vibration to be suppressed is generated in the rotary shaft 3.

$$k'\text{-value} = 60 \times \text{Chatter frequency}/(\text{Number of tool blades} \times \text{Rotation speed of rotary shaft}), \quad (1)$$

$$k\text{-value} = \text{Integer portion of } k'\text{-value, and} \quad (2)$$

$$\text{Phase information} = k'\text{-value} - k\text{-value}, \quad (3)$$

where the "Number of tool blades" in the calculating expression (1) is supposed to be preset in the parameter calculating unit 7. Also, the rotation speed of the rotary shaft in the calculating expression (1) refers to a current rotation speed (before optimizing the rotation speed).

Subsequently, in S35, the phase information obtained with the calculating expression (3) is compared with a setting constant. If the phase information is equal to or larger than the setting constant, the k1-value is calculated in S36 on the basis of a modifying expression (3). On the other hand, if the phase information is smaller than the setting constant, the k1-value is calculated in S37 on the basis of a modifying expression (4).

$$k1\text{-value} = k\text{-value} + 1 \quad \text{Modifying expression (3)}$$

$$k1\text{-value} = k\text{-value} \quad \text{Modifying expression (4)}$$

In addition, if the setting constant is set to 0.5 typically, an amount of change in the rotation speed is minimized. However, if a changing rate of the rotation speed is small, a lower cutting limit in the stability limit diagram may be fallen below and the regenerative type chatter vibration may be generated, depending on a direction in which the rotation speed is changed, so that it is only necessary to compare the lower limit as the setting constant with the phase information. In this case, the setting constant of 0.75 is preferably selected.

Subsequently, in S38, the optimum rotation speed is calculated on the basis of the following calculating expression (6) using the chatter frequency, number of tool blades, and the k1-value obtained in S36 or S37.

$$\text{Optimum rotation speed} = 60 \times \text{Chatter frequency}/(\text{Number of tool blades} \times k1\text{-value}) \quad (6)$$

Finally, in S39, the rotation speed of the rotary shaft 3 is changed with the NC device 8 so as to be made equal to the calculated optimum rotation speed to thereby prevent amplification of the chatter vibration, i.e., to suppress the chatter vibration.

In the above manner, the suppression control of the chatter vibration is performed in the control device 5.

As described above, the vibration suppressing device 10 according to the Embodiment 3 monitors the chatter vibration generated during rotation of the rotary shaft 3 with use of the vibration sensors 2a to 2c, the FFT calculating unit 6, and the parameter calculating unit 7 in real time. Then, the device 10 calculates the optimum rotation speed on the basis of the above calculating expressions (1) to (3) and (6) and modifying expressions (3) and (4) immediately after the generation of the chatter vibration is detected, and makes the rotation speed of the rotary shaft 3 equal to the optimum rotation speed to thereby suppress the amplification of the chatter vibration. That is, the optimum rotation speed is calculated on the basis of the chatter vibration generated in the rotary shaft 3 that is actually being rotated, so that the optimum rotation speed can be immediately calculated more accurately. In particular, the parameter calculating unit 7 compares the phase information with the setting constant, and calculates the optimum rotation speed with a parameter being changed depending on a result of the comparison. As a result, it becomes possible to suppress the chatter vibration in a short time. Accordingly, the finishing accuracy of the machined surface can be kept high in quality, and it can also be expected to suppress the tool from wearing and prevent the tool from chipping.

Figure 9:
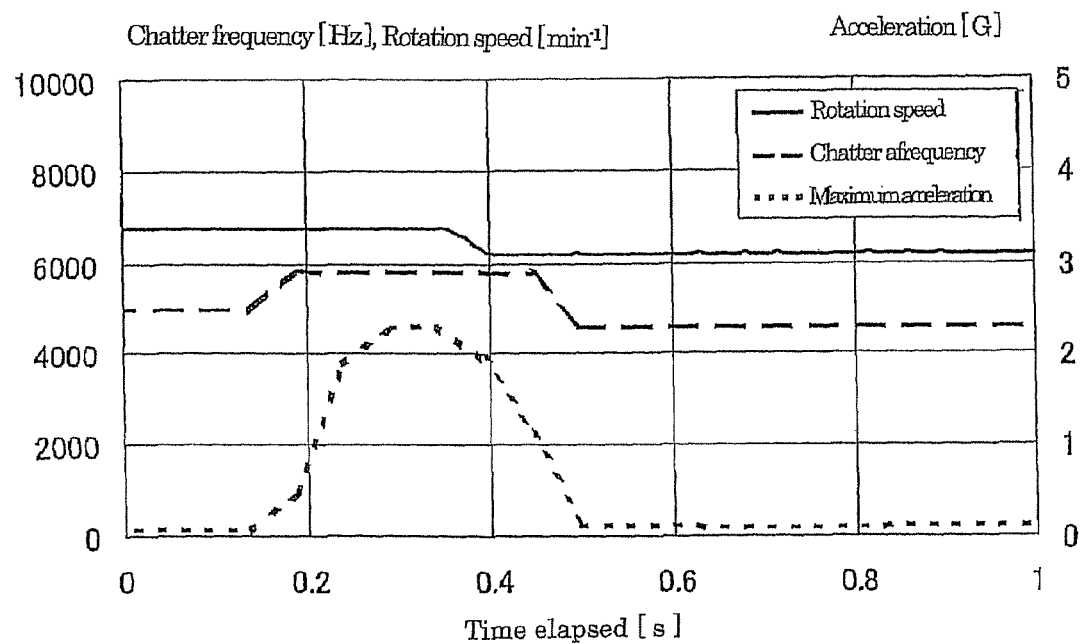
FIG. 9 is a graph illustrating a conventional suppressing effect on the chatter vibration.
Figure 10:
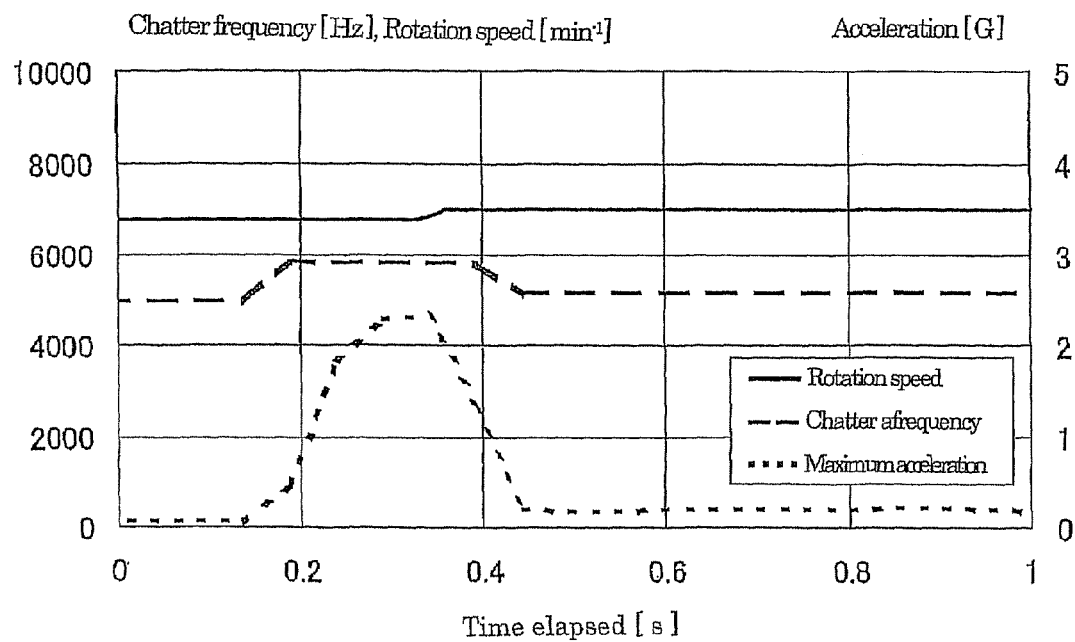
FIG. 10 is a graph illustrating a suppressing effect on the chatter vibration, according to the Embodiment 3.

FIGS. 9 and 10 are graphs illustrating suppressing effects of chatter frequencies (frequencies of chatter vibration) for the cases where a conventional vibration suppressing device not employing the present invention is employed and the vibration suppressing device of the present invention is employed, respectively. In the case of FIG. 9, the rotation speed is largely changed from 6800 $\min^{-1}$ to 6250 $\min^{-1}$, and therefore it takes long to suppress the chatter vibration. On the other hand, in the case of FIG. 10, the rotation speed is rapidly changed from 6800 $\min^{-1}$ to 7000 $\min^{-1}$ to reach the optimum rotation speed, and therefore the maximum acceleration G can be decreased faster than the timing in FIG. 9 to thereby suppress the chatter vibration in a short time.

In the above Embodiment 3, for example, the phase information, k-value, setting constant, and the like, and relationships among them as represented by the calculating expressions (1) to (3) and (6) and modifying expressions (3) and (4) can be appropriately checked and determined depending on a type of a machine tool, so that the accuracy can be further improved.

Regarding the optimum rotation speed calculated from the above k1-value, instead of the procedure in S35 to S38, a procedure may be taken so as to calculate two optimum rotation speeds respectively from the k-value and the k-value+1 in the calculating expression (6); on the basis of differences between the two optimum rotation speeds and a current rotation speed, select as the optimum rotation speed one of the two optimum rotation speeds, which has a smaller amount of change in rotation speed; and change the rotation speed of the rotary shaft 3 to it in the NC device 8 to suppress the chatter vibration.

Also, each of the above embodiments is adapted to perform the control pertaining to the suppression of the "chatter vibration" by using a pinnacle having the maximum frequency-domain vibrational acceleration value obtained from the result of the Fourier analyses of the time-domain vibrational accelerations detected by the detecting means; however, the optimum rotation speed may be calculated by using a plurality of (e.g., three) pinnacles having frequency-domain vibrational acceleration values higher than those of the rest, to thereby further improve the suppression effect on the "chatter vibration".

Further, the above embodiment is respectively configured to detect the vibrational accelerations of the rotary shaft with the detecting means, and calculate the optimum rotation speed on the basis of the detected vibrational accelerations; however, a configuration may be made such that the detecting means detects a displacement or sound pressure due to the vibration, and the optimum rotation speed is calculated on the basis of the detected displacement or sound pressure.

Still further, the above embodiment is respectively configured to detect the vibration of the rotary shaft of the machine tool such as a so-called machining center in which the tool is rotated; however, a configuration may be made such that vibration of or near the work, which corresponds to a non-rotating side (fixed side), is detected. Still further, the present invention is applicable to a machine tool such as a lathe in which the work is rotated, and in such a case, vibration on a main spindle side, which corresponds to the rotary shaft and holds the work, may be detected, or vibration of the tool, which corresponds to the fixed side, may be detected. In addition, it should be appreciated that attaching positions, the number of the attachment, and the like of the detecting means may be appropriately changed depending on a type, size, or the like of the machine tool.

An embodiment for realizing the vibration suppressing method of the present invention is not limited to the vibration suppressing device in each of the above embodiments. For example, the above embodiments are configured such that, in the control device, the NC device automatically controls the rotation speed of the rotary shaft when the optimum rotation speed is calculated with the FFT calculating unit and Parameter calculating unit, to thereby perform the calculating step of calculating the optimum rotation speed and the controlling step of controlling the rotary shaft to the optimum rotation speed; however, instead of such configuration, it may be modified such that, for example, the optimum rotation speed obtained with the FFT calculating unit is once displayed on a display part to inform an operator, and the operator performs an input operation to the NC device to thereby change the rotation speed of the rotary shaft to the optimum rotation speed. That is, any modification may be made without departing from the scope of the present invention.

What is claimed is:

1. A vibration suppressing device for suppressing vibrations generated during machining a work in a machine tool, comprising:
 a rotary shaft for rotating a tool or a work;
 detecting means to detect a time-domain vibration due to the rotating rotary shaft;
 calculating means to calculate a chatter frequency and a frequency-domain vibration at the chatter frequency on a basis of the time-domain vibration detected by the detecting means, to calculate phase information using the chatter frequency and number of tool blades of the machine tool, and calculate an optimum rotation speed of the rotary shaft for suppressing chatter vibration on a basis of the phase information when the calculated frequency-domain vibration exceeds a predetermined threshold value; and
 rotation speed controlling means to rotate the rotary shaft at the optimum rotation speed calculated by the calculating means, wherein the chatter vibration generated during the machining of the work by rotation of the rotary shaft is suppressed.

2. The vibration suppressing device for the machine tool according to claim 1, wherein the calculating means calculates the optimum rotation speed with use of a k-value and phase information calculated on a basis of at least after-mentioned expressions (1) to (3):

$$k'\text{-value}=60\times\text{Chatter frequency}/(\text{Number of tool blades}\times\text{Rotation speed of rotary shaft}) \quad (1);$$

$$k\text{-value}=\text{Integer portion of }k'\text{-value} \quad (2);\text{ and}$$

$$\text{Phase information}=k'\text{-value}-k\text{-value} \quad (3).$$

3. The vibration suppressing device for the machine tool according to claim 2, wherein the calculating means preliminarily stores a plurality of coefficients corresponding to the k-value and the phase information calculated by the expressions (1) to (3), selects an appropriate one of the coefficients on a basis of the calculated k-value and the calculated phase information, and calculates the optimum rotation speed with use of the specific coefficient.

4. The vibration suppressing device for the machine tool according to claim 1, wherein the calculating means identifies a type of the generated chatter vibration on a basis of a predetermined condition when calculating the optimum rotation speed, and calculates the optimum rotation speed by changing the predetermined parameter depending on the identified type of the chatter vibration.

5. The vibration suppressing device for the machine tool according to claim 4, wherein the calculating means calculates the optimum rotation speed on a basis of following calculating expressions (1) to (4) deriving the predetermined parameter, identifies the type of the chatter vibration from phase information calculated on a basis of the calculating expression (3), and changes a k1-value in the calculating expression (4) on a basis of the predetermined condition:

$k'$-value=60×Chatter frequency/(Number of tool blades×Rotation speed of rotary shaft)  (1);

$k$-value=Integer portion of $k'$-value  (2);

Phase information=$k'$-value–$k$-value  (3); and

Optimum rotation speed=60×Chatter frequency/(Number of tool blades×$k1$-value)  (4).

6. The vibration suppressing device for the machine tool according to claim 5, wherein the calculating means determines the chatter vibration to be forced chatter vibration when the phase information obtained by the calculating expression (3) has a value close to 0, adds 0.5 or –0.5 to the phase information to obtain the k1-value, and calculates the optimum rotation speed from the calculating expression (4).

7. The vibration suppressing device for the machine tool according to claim 1, wherein the calculating means calculates the optimum rotation speed such that an amount of change in rotation speed is minimized by changing the predetermined parameter on a basis of the predetermined condition, when calculating the optimum rotation speed.

8. The vibration suppressing device for the machine tool according to claim 7, wherein the calculating means calculates the optimum rotation speed on a basis of following calculating expressions (1) to (4) deriving the predetermined parameter, compares phase information calculated on a basis of the calculating expression (3) with a predetermined setting constant, and changes a k-value in the calculating expression (4) on a basis of a result of the comparison:

$k'$-value=60×Chatter frequency/(Number of tool blades×Rotation speed of rotary shaft)  (1);

$k$-value=Integer portion of $k'$-value  (2);

Phase information=$k'$-value–$k$-value  (3); and

Optimum rotation speed=60×Chatter frequency/(Number of tool blades×$k$-value)  (4).

9. The vibration suppressing device for the machine tool according to claim 8, wherein the calculating means adds 1 to the k-value in the calculating expression (4) to calculate the optimum rotation speed when the phase information is equal to or larger than a predetermined setting constant 0.5.

10. The vibration suppressing device for the machine tool according to claim 8, wherein the calculating means adds 1 to the k-value in the calculating expression (4) to calculate the optimum rotation speed when the phase information is equal to or larger than a predetermined setting constant 0.75.

11. The vibration suppressing device for the machine tool according to claim 8, wherein the calculating means calculates the optimum rotation speed having a minimized amount of change in rotation speed by calculating two optimum rotation speeds respectively for cases where the k-value in the calculating expression (4) is k and k+1, and selecting one of the two optimum rotation speeds which has a smaller difference from a current rotation speed.

12. A vibration suppressing method for a machine tool provided with a rotary shaft for rotating a tool or a work, the vibration suppressing method comprising:
    a detecting step of detecting a time-domain vibration due to the rotating rotary shaft;
    a calculating step of calculating a chatter frequency and frequency-domain vibration at the chatter frequency on a basis of the time-domain vibration detected in the detecting step, calculating phase information using the chatter frequency and number of tool blades of the machine tool, and then calculating an optimum rotation speed of the rotary shaft capable of suppressing chatter vibration on a basis of the phase information when the calculated frequency-domain vibration exceeds a predetermined threshold value; and
    a controlling step of rotating the rotary shaft at the optimum rotation speed calculated in the calculating step, wherein the chatter vibration generated during the machining of the work by rotation of the rotary shaft is suppressed.

13. The vibration suppressing method for the machine tool according to claim 12, wherein the calculating step, the optimum rotation speed is calculated with use of a k-value and phase information calculated on a basis of at least after-mentioned expressions (1) to (3):

$k'$-value=60×Chatter frequency/(Number of tool blades×Rotation speed of rotary shaft)  (1);

$k$-value=Integer portion of $k'$-value  (2); and

Phase information=$k'$-value–$k$-value  (3).

14. The vibration suppressing method for the machine tool according to claim 13, wherein the calculating step, a plurality of coefficients corresponding to the k-value and the phase information calculated by the expressions (1) to (3) are preliminarily stored, an appropriate one of the coefficients on a basis of the calculated k-value and the calculated phase information is selected, and the optimum rotation speed with use of the specific coefficient is calculated.

15. The vibration suppressing method for the machine tool according to claim 12, wherein in the calculating step, a type of the generated chatter vibration is identified on a basis of a predetermined condition when the optimum rotation speed is calculated, and the optimum rotation speed is calculated by changing the predetermined parameter depending on the identified type of the chatter vibration.

16. The vibration suppressing method for the machine tool according to claim 15, wherein the calculating step, the optimum rotation speed on a basis of following calculating expressions (1) to (4) deriving the predetermined parameter is calculated, the type of the chatter vibration from phase information calculated on a basis of the calculating expression (3) is identified, and a k1-value in the calculating expression (4) on a basis of the predetermined condition is changed:

$$k'\text{-value} = 60 \times \text{Chatter frequency}/(\text{Number of tool blades} \times \text{Rotation speed of rotary shaft}) \quad (1);$$

$$k\text{-value} = \text{Integer portion of } k'\text{-value} \quad (2);$$

$$\text{Phase information} = k'\text{-value} - k\text{-value} \quad (3); \text{ and}$$

$$\text{Optimum rotation speed} = 60 \times \text{Chatter frequency}/(\text{Number of tool blades} \times k1\text{-value}) \quad (4).$$

17. The vibration suppressing method for the machine tool according to claim 16, wherein the calculating step, the chatter vibration is determined to be forced chatter vibration when the phase information obtained by the calculating expression (3) has a value close to 0, 0.5 or −0.5 is added to the phase information to obtain the k1-value, and the optimum rotation speed is calculated from the calculating expression (4).

18. The vibration suppressing method for the machine tool according to claim 12, wherein the calculating step, the optimum rotation speed is calculated such that an amount of change in rotation speed is minimized by changing the predetermined parameter on a basis of the predetermined condition, when optimum rotation speed is calculated.

19. The vibration suppressing method for the machine tool according to claim 18, wherein the calculating step, the optimum rotation speed is calculated on a basis of following calculating expressions (1) to (4) deriving the predetermined parameter, phase information calculated on a basis of the calculating expression (3) is compared with a predetermined setting constant, and a k-value in the calculating expression (4) is changed on a basis of a result of the comparison:

$$k'\text{-value} = 60 \times \text{Chatter frequency}/(\text{Number of tool blades} \times \text{Rotation speed of rotary shaft}) \quad (1);$$

$$k\text{-value} = \text{Integer portion of } k'\text{-value} \quad (2);$$

$$\text{Phase information} = k'\text{-value} - k\text{-value} \quad (3); \text{ and}$$

$$\text{Optimum rotation speed} = 60 \times \text{Chatter frequency}/(\text{Number of tool blades} \times k\text{-value}) \quad (4).$$

20. The vibration suppressing method for the machine tool according to claim 19, wherein the calculating step, the optimum rotation speed is calculated by adding 1 to the k-value in the calculating expression (4) when the phase information is equal to or larger than a predetermined setting constant 0.5.

21. The vibration suppressing method for the machine tool according to claim 19, wherein the calculating step, the optimum rotation speed is calculated by adding 1 to the k-value in the calculating expression (4) when the phase information is equal to or larger than a predetermined setting constant 0.75.

22. The vibration suppressing method for the machine tool according to claim 19, wherein the calculating step, the optimum rotation speed having a minimized amount of change in rotation speed is calculated by calculating two optimum rotation speeds respectively for cases where the k-value in the calculating expression (4) is k and k+1, and selecting one of the two optimum rotation speeds which has a smaller difference from a current rotation speed.

* * * * *